United States Patent Office 3,107,709
Patented Oct. 22, 1963

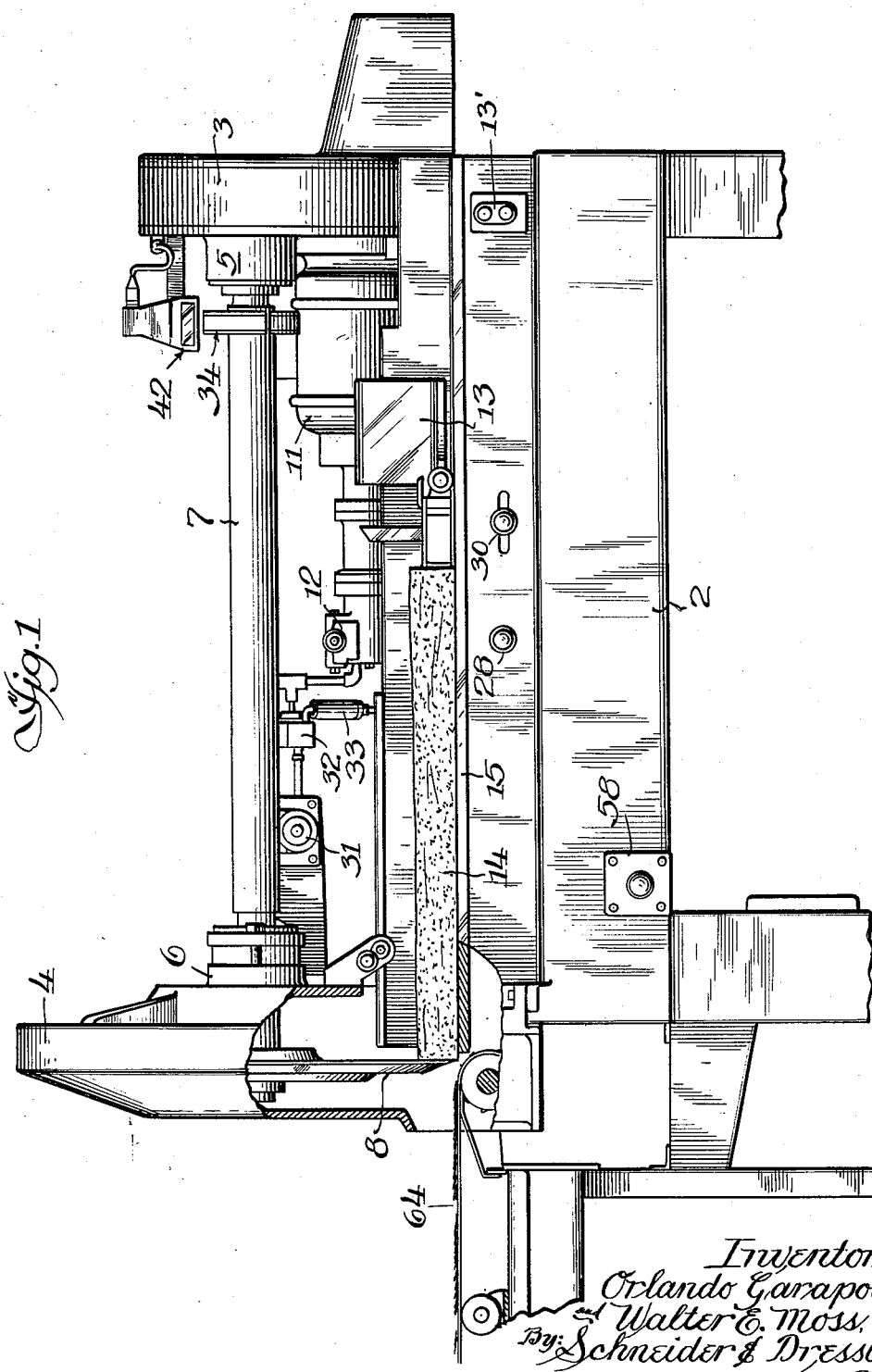

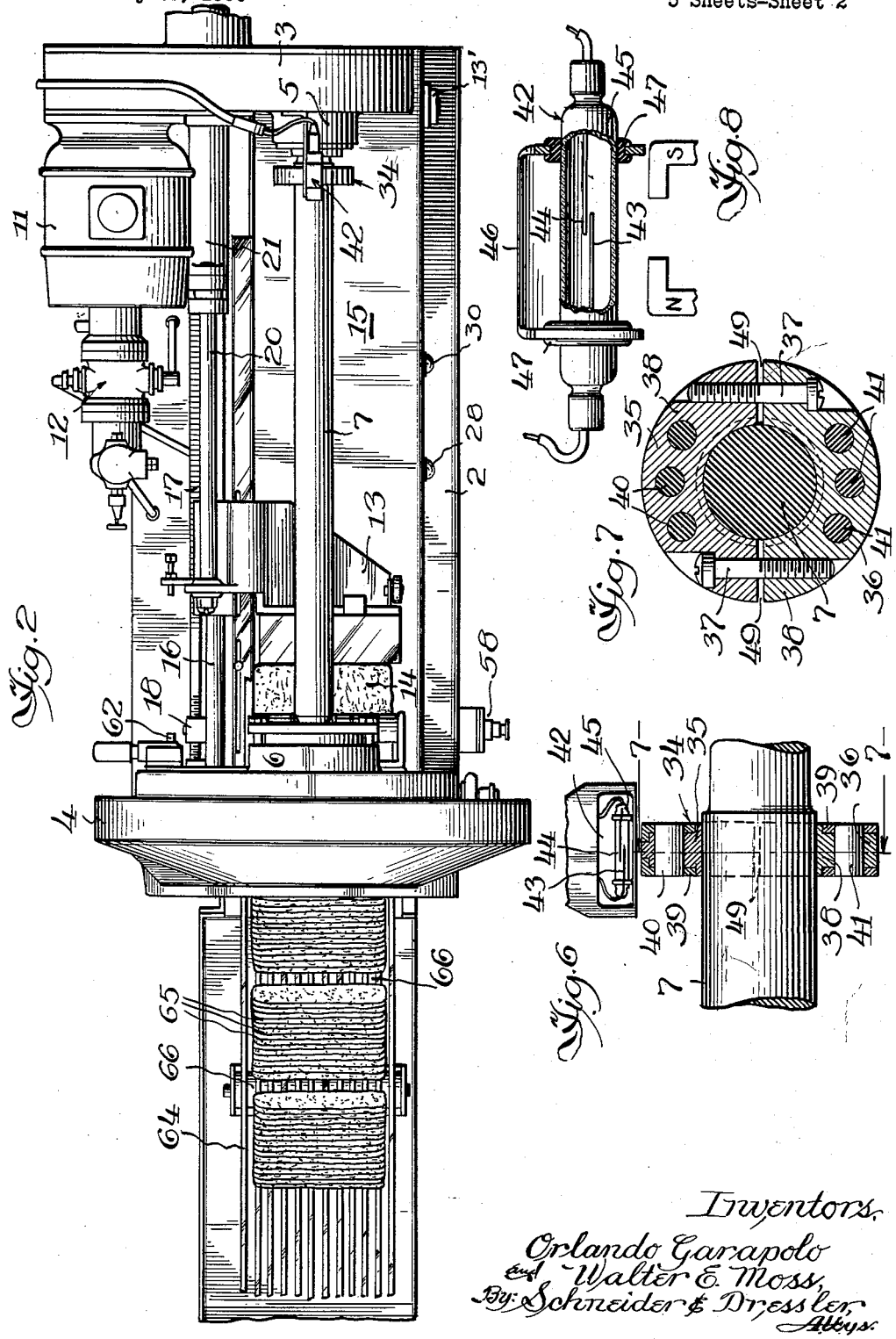

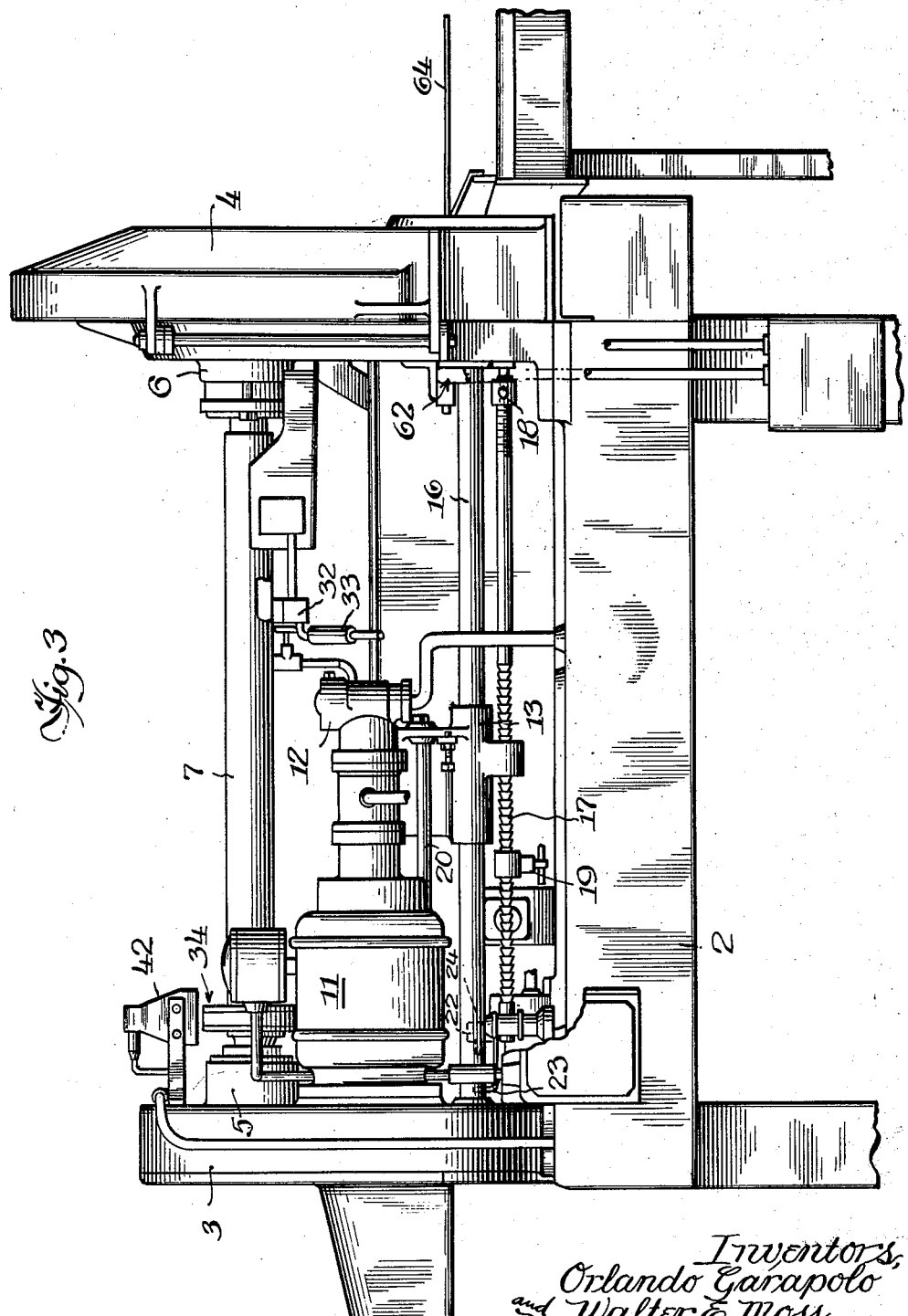

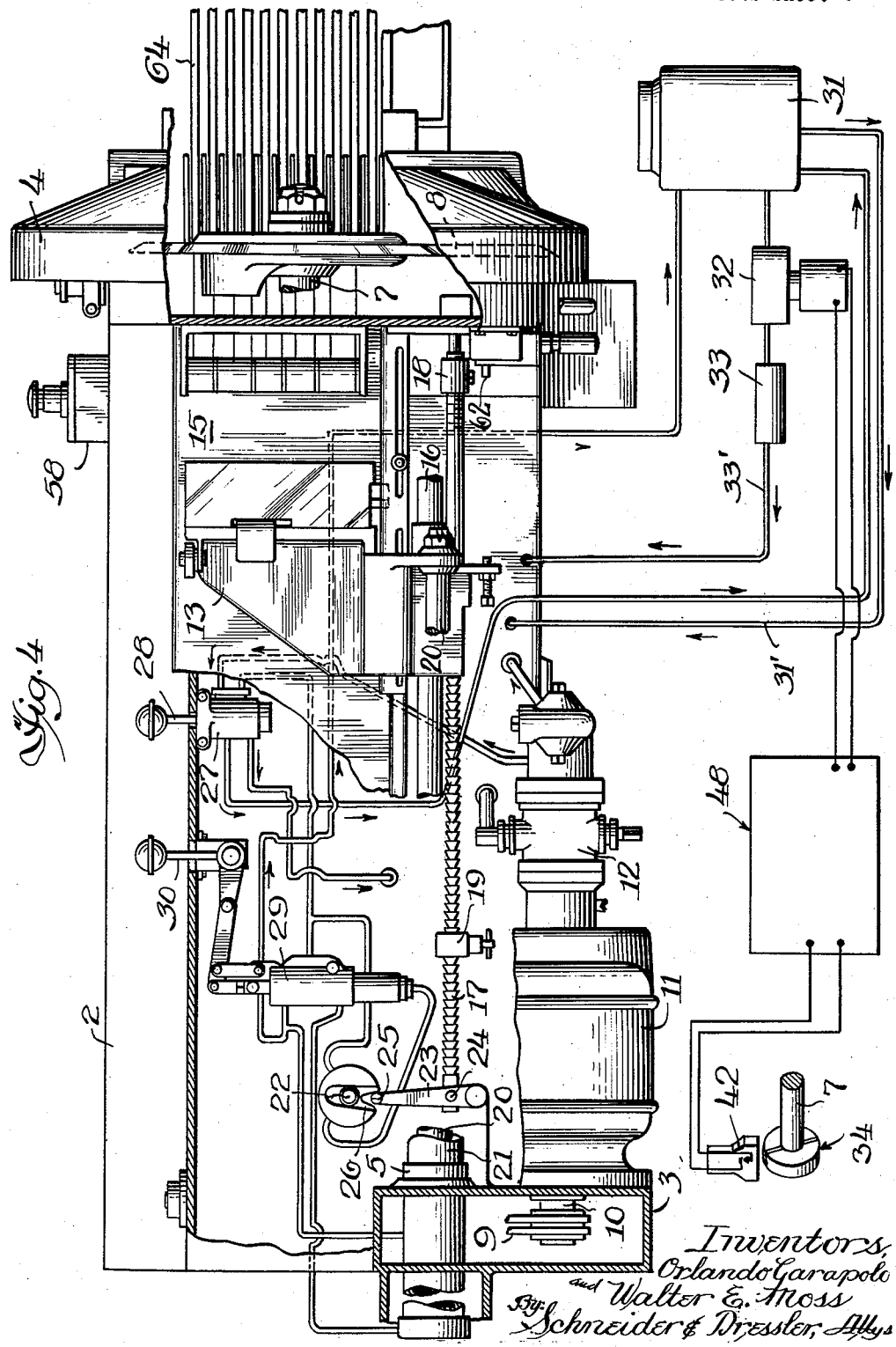

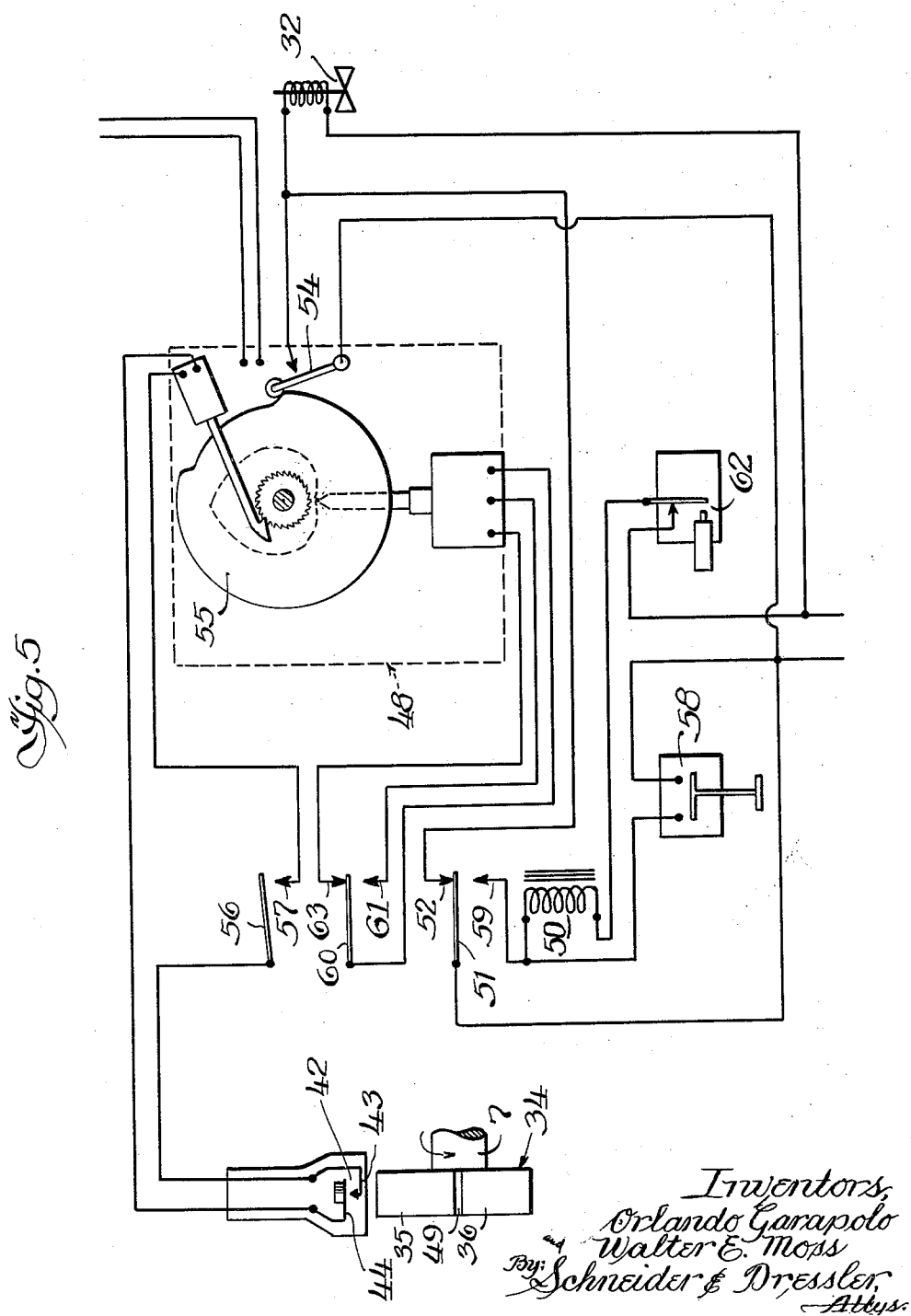

3,107,709
INTERMITTENT FEED DEVICE FOR
BACON SLICING MACHINE
Orlando Garapolo, Chicago, and Walter E. Moss, Brookfield, Ill., assignors to Wilson & Co., Inc., a corporation of Delaware
Filed May 31, 1956, Ser. No. 588,395
1 Claim. (Cl. 146—95)

This invention relates to an intermittent feed device for bacon slicing machines, and is particularly concerned with means for controlling the feeding movement of a slab of meat, such as bacon, towards the slicing blade by reference to the rotational movement of a continuously driven shaft on which the slicing blade is mounted.

In slicing bacon, the conventional procedure consists in placing a slab of bacon on a supporting table, engaging one end of the bacon with a movable carriage, and feeding the bacon towards the slicing blade by moving the carriage in the desired direction. The slicing blade is run at a fixed speed, and the individual bacon slices fall on to a conveyor in uniformly overlapped arrangement. The bacon is generally packaged in units of predetermined weight, such as a pound or half-pound, and a skilled operator picks a number of slices from the conveyor by hand, and places it on a suitable card or wrapper and sends it to a weighing station. The slices picked up by the skilled operator approximate the weight to be packaged as a unit.

If the scales show that the number of slices actually picked by the operator is within the allowed tolerance, the specific unit is ready to be packaged. Generally the operator picks up a weight of bacon slightly less than the desired amount, and the proper weight is established by adding a smaller slice or a portion of a slice of bacon. When top quality bacon is being sliced, a whole slice removed from one group cannot be conveniently added to another group, because too much time would be required to arrange it so that the uniform appearance of the package would not be impaired.

The bacon slicing machine to which the intermittent feed device of the present invention is applied, is fully disclosed in the patent to Garapolo, No. 2,642,910, granted June 23, 1953.

In accordance with the present invention, the slicing blade and the conveyor belt are operated in the usual manner, but the forward movement of the carriage for feeding the slab of meat to the slicing blade is controlled by the rotation of the shaft on which the slicing blade is mounted. The shaft rotates constantly at a fixed speed, and after a predetermined number of rotations of the shaft, the forward movement of the carriage is interrupted, while the conveyor is still moving, to provide intervals of space between two successive slices. In this way the slices are grouped, the slice before the pause becoming the last slice of one group of slices, and the first slice after the pause becoming the first slice of the succeeding group of slices. In this way the number of slices in a group can be predetermined, and even an unskilled operator can pick up the predetermined number of slices every time without difficulty.

The intervals between feeding each group of slices are controlled automatically, as desired, preferably by electromechanical means. The shaft of the slicing machine has mounted thereon a collar provided with a magnet that actuates a switch to transmit an impulse to an electrical counter every time the shaft rotates. When the counter circuit is not energized nothing happens, as the impulse is not transmitted to the counter and the slicing machine will operate in conventional manner. A switch button for energizing the counter circuit is mounted on the machine. The carriage moves forward in a normal manner as a slab of bacon is placed on the supporting table. The first few slices of bacon are irregular, and the switch button is not actuated until the first few slices have been cut.

When the operator presses the switch button the counter circuit is energized, and the first impulse moves a solenoid valve to stop the flow of fluid in the hydraulic system to stop the movement of the feed carriage without stopping the conveyor. This causes the first few irregular slices of bacon to move forwardly while the counter is adding the subsequent count of impulses. After the predetermined number of impulses, say five, have been received by the counter, and the first setting of the counter is reached, the solenoid valve allows fluid to flow in the hydraulic system to start forward movement of the carriage, which remains under the automatic control of the counter until the counter circuit is deenergized in a manner hereinafter disclosed.

The carriage then moves in a normal manner until the count reaches the second setting, at which time the carriage feed stops automatically, and the conveyor continues to move while the carriage feed remains stationary for a predetermined interval. The number of impulses in the count between the first and second settings is equal to the number of bacon slices desired in each group. It is desirable to slice the bacon as fast as practical, and therefore the pauses between each group of slices are kept to about a five count, which provides a small, but definite, space between each group of slices. The intermittent motion of the carriage continues until the entire slab has been sliced. When the carriage has moved forwardly to the limit of its travel, it strikes a switch and thereby deenergizes the counter circuit so that the carriage moves in normal manner until the switch button is again pressed to energize the counter circuit. The switch may also be actuated manually if desired, to deenergize the counter circuit at any time.

The structure by means of which the above mentioned and other advantages of the invention are attained will be described in the following specification, taken in conjunction with the accompanying drawings, showing a preferred illustrative embodiment of the invention, in which:

FIGURE 1 is a side elevational view of a bacon slicing machine embodying the invention, looking at the machine from the operator's side;

FIG. 2 is a top plan view of the machine shown in FIG. 1;

FIG. 3 is a side elevational view of the machine from the side opposite the operator;

FIG. 4 is a top plan view, with parts broken away, and showing the counter and portions of the hydraulic system diagrammatically;

FIG. 5 is a diagrammatic view of the electrical circuit for controlling the feed carriage;

FIG. 6 is a fragmentary view, partly in section and partly in elevation, of the magnetic switch mechanism with the switch actuating means mounted on the shaft of the slicing machine;

FIG. 7 is a cross-sectional view, taken along the line 7—7 of FIG. 6; and

FIG. 8 is an enlarged detail view, partly in elevation and partly in section, showing the structure of the magnetic switch and its relationship to the magnetic poles of the switch actuating means.

In the drawings, the bacon slicing machine comprises a base 2 upon which upstanding end members 3 and 4 are mounted. End members 3 and 4 are provided respectively with bearings 5 and 6 in which opposite ends of a rotatable shaft 7 are mounted. A slicing blade 8 is mounted on one end of shaft 7 and is housed in end member 4. The slicing blade is not limited to a single cutting edge, but may be a multiple blade having two or more cutting edges. The other end of shaft 7 carries a pulley (not shown) which is rotated by a belt 9 extending around the pulley and a driving shaft 10 rotated by a motor 11. Shaft 10 rotates constantly at a fixed rate of speed as long as the machine is in operation. The motor 11 also operates a pump 12 which forces fluid through the hydraulic system to control the reciprocatory movement of a carriage 13.

The slab of bacon 14 to be sliced is positioned on a receiving table 15. The carriage 13 is mounted on a guide rod 16 and a control rod 17 is provided, on which stop members 18 and 19 are mounted to limit the longitudinal movement of the carriage which pushes the slab of bacon in front of it. The control rod 17 has a limited movement, for the purpose hereinafter set forth. The carriage is connected to a piston rod 20 by means of which it is reciprocated.

As shown in FIG. 4, piston rod 20 is connected to a piston mounted in a cylinder 21. The direction of movement of the piston rod 20 is controlled by a rotary pivot valve 22. A bell crank or lever 23 is pivoted to control rod 17, as indicated at 24, and has one end 25 positioned to engage a projection, such as arms 26, secured to valve 22 so as to reverse the valve every time bell crank 23 is moved about pivot 24. Engagement of carriage 13 with either stop member 18 or 19 causes a longitudinal movement of rod 17, which in turn, causes pivotal movement of bell crank 23 and thus operates valve 22 and reverses the movement of the carriage.

The hydraulic system for moving the carriage 13 is conventional, and will not be described in detail. It includes a two way valve 27 controlled by a lever 28 to start and stop the flow of hydraulic fluid through the system, and a four way valve 29, controlled by a lever 30, to increase the speed of the forward and rearward movement of the carriage. The lines interconnecting the various valves, pump, and the tank of the hydraulic cylinder are shown in FIG. 4 with arrows indicating the direction of flow.

A flow control valve 31 is interposed between valve 29 and the fluid (oil) supply tank (not shown) housed within base 2. A solenoid valve 32 and a relief pressure valve 33 are positioned in the hydraulic system between the flow control valve 31 and the supply tank. The relief pressure valve 33 is positioned on the exhaust side of valve 32 to help balance the fluid pressure between the pump and the exhaust. The fluid is returned to the supply tank from valve 31 through line 31' and from valve 33 through line 33'. The solenoid valve 32 is controlled by the electrical system hereinafter described, and serves to start and stop the flow of fluid out of cylinder 21 to respectively, move the carriage and to stop it.

Referring to FIGS. 6, 7 and 8, a collar 34 mounted on shaft 7 to rotate therewith comprises two semi-cylindrical sections 35 and 36 secured to each other by screws 37. Each section comprises a core 38 of non-magnetic metal, such as aluminum, and annular discs 39 of steel. Section 35 has a plurality of pins 40 extending transversely therethrough, and section 36 has a plurality of pins 41 extending transversely through it. Pins 40 and 41 hold the steel discs to the aluminum core. Pins 40 are magnetized, with corresponding poles on the same end of each pin. Section 36 could be made of a single metal without pins 41, but it is preferred to make both sections alike for ease of manufacture and to insure an equal distribution of weight throughout the collar.

A magnetic switch 42 comprising two spaced contact blades 43 and 44 mounted in a glass tube 45 is mounted in a bracket 46. Rubber grommets 47 are provided on the glass tube to hold it in the bracket and to protect it from vibration or other shocks. Every revolution of the shaft 7 causes the magnets 40 to pass closely by switch 42 and the magnetic force brings contact blades 43 and 44 together to send an impulse through the counter 48. After magnets 40 move away from switch 42 the contact blades 43 and 44 separate. As shown in FIG. 7, a small gap 49 is provided between sections 35 and 36 to keep section 36 from becoming magnetized by contact with section 35.

As indicated in FIG. 4, the electrical equipment for the control mechanism is remote from the machine to protect the electrical equipment and to reduce the amount of cleaning that must be done. Since the machine is used for meat it must be kept clean constantly, and if the electrical equipment were mounted on the machine it would also require frequent cleaning. The counter and its operation can be understood by reference to FIG. 5.

In FIG. 5 the electrical circuit is in starting condition with the operate relay 50 deenergized, and the counter 48 in its home position. The counter 48 may be any counter, such as a "Kellogg Decade Counter" which is commercially available. One suitable embodiment of the counter is "Multi-Digit Decade Counter Code 100–2," manufactured by Kellogg Switchboard and Supply Company, Chicago, Illinois. The counter contains a multiplicity of relays capable of certain functions, but, since the counter itself is not part of the present invention, it is shown schematically in FIG. 5 to indicate its functions.

In the position of FIG. 5 solenoid valve 32 is held open by contacts 51, 52 on the operate relay 50 which shunt the counter control switch 54. The advance cam 55 remains stationary because contacts 56, 57 are open. The carriage 13 may move in normal manner, unaffected by the counter. This movement is controlled by a conventional starting and stopping switch 13. When the grouping switch 58 is closed momentarily it energizes operate relay 50 to hold contacts 51, 59 closed, thereby energizing the circuit containing the counter control switch 54. The counter starting position is such that switch 54 is opened, allowing the solenoid valve 32 to close, thus stopping the movement of the carriage 13. Relay 50 also holds contacts 56, 57 and 60, 61 closed.

The closing of contacts 56, 57 energizes the circuit containing advance cam 55, and each rotation of shaft 7 closes the shaft actuated switch 42 to transmit one impulse to advance cam 55. After a predetermined number of impulses transmitted from switch 42, cam 55 closes switch 54, thereby opening solenoid valve 32. While valve 32 is open the carriage 13 continues to move, causing slicing blade 8 to produce slices of meat until cam 55 opens switch 54 in accordance with the predetermined count pattern, thereby closing the solenoid valve and stopping the carriage 13 so as to produce a gap 66 between groups of slices 65. This procedure repeats until the carriage strikes reset switch 62 to deenergize the operate relay 50. When this occurs contacts 56, 57 open to stop the counting action, contacts 60, 63 close to energize the reset circuit and thereby restore the counter to home position, and contacts 51, 52 close to shunt the switch 54 and hold solenoid valve 32 open to allow carriage 13 to return in its normal manner. The pattern of the counter may be arranged to provide a gap 66 of any desired length between groups of slices having any desired number of slices 65 in each group.

To summarize the operation, a slab of meat 14, such as bacon, is placed on the table 15 in front of carriage 13, and the carriage is moved forwardly in conventional manner until the first few slices are cut from the slab by the rotating blade 8. These slices fall in regular overlapping formation on to conveyor 64 which moves continuously. When the first few slices, which are normally not uniform in area, have been cut, grouping switch 58 is manually actuated by pressing the switch momentarily and then releasing it. This energizes the counter circuit and closes the solenoid valve 32 so that the feeding movement of carriage 13 stops. The conveyor carries the non-uniform slices forwardly until the predetermined number of shaft revolutions have occurred. Since the carriage is stationary during this period no meat is pushed under the slicing blade and no slices are cut even though the shaft and slicing blade continue to rotate at their regular speed.

After the predetermined count, valve 32 is opened and carriage 13 moves until valve 32 is again closed. This closing of valve 32 takes place automatically after a predetermined number of slices 65 are cut. These slices also fall on to the conveyor in regular overlapping formation, with the first slice spaced from the last slice of the preceding group by a gap 66 having a length equal to the longitudinal movement of the conveyor 64 during the period that no slices were cut. After the predetermined number of slices has been cut, valve 32 is again closed so that the cut slices move away from the first slice of the next group of slices. This intermittent feeding and stopping of the carriage continues until reset switch 62 is closed, either by engagement with the front end of carriage 13 when it reaches the forward end of its movement, or by manual operation of the switch 62. The carriage then moves back to its starting position to receive another slab of meat.

Although the present invention has been described with particular reference to a bacon slicing machine, it will be obvious that the means to control the movement of the carriage may be used with other machines of similar nature. The description, while limited to a preferred embodiment of the invention, is intended to be illustrative, rather than restrictive, as many details may be modified or changed without departing from the scope of the appended claim. Accordingly, we do not desire to be restricted to the exact structure described.

We claim:

In a meat slicing machine, a rotatable shaft, means for continuously rotating said shaft, a slicing blade mounted on said shaft, a movable carriage for moving meat into engagement with said blade, hydraulic means for moving said carriage towards and away from said blade, said hydraulic means including a solenoid valve, a first switch, means on said shaft for actuating said first switch upon each revolution of said shaft, a counter, a counter control switch connected electrically to said first switch through said counter and adapted to be actuated by an accumulation of a predetermined number of electrical impulses one of which is transmitted to said counter by said first switch upon each actuation of said first switch, said counter control switch being operable upon actuation to control said solenoid valve whereby movement of said carriage may be interrupted or continued, and electrical connections between said first switch and said solenoid valve to shunt said counter control switch during rearward movement of said carriage to prevent actuation of said counter control switch during rearward movement of said carriage.

References Cited in the file of this patent

UNITED STATES PATENTS

| | | |
|---|---|---|
| 2,179,535 | Wolff | Nov. 14, 1939 |
| 2,642,910 | Garapolo | June 23, 1953 |
| 2,692,629 | Gardner | Oct. 26, 1954 |
| 2,744,553 | Folk | May 8, 1956 |
| 2,768,666 | Garapolo et al. | Oct. 30, 1956 |
| 2,803,110 | Chittenden | Aug. 20, 1957 |
| 2,804,749 | Svenson | Sept. 3, 1957 |
| 2,870,810 | Folk | Jan. 27, 1959 |

OTHER REFERENCES

"Shingle and Weigh Bacon Automatically" in the National Provisioner of March 19, 1955, pages 8, 9 and 10.